June 9, 1959 R. ARONSTEIN 2,890,363

METHOD AND APPARATUS FOR IMAGE REPRODUCTION

Filed Aug. 16, 1954

INVENTOR
ROBERT ARONSTEIN
BY Joseph A. Schaines
ATTORNEY 2,890,363
Patented June 9, 1959

2,890,363

METHOD AND APPARATUS FOR IMAGE REPRODUCTION

Robert Aronstein, Brooklyn, N.Y.

Application August 16, 1954, Serial No. 450,037
4 Claims. (Cl. 313—92)

This invention relates to the reproduction of images and more specifically to a method and apparatus for obtaining among other things improved picture brilliance, definition, and color rendition. While this invention is particularly for use in connection with the reproduction of televised images in both monochrome and color, it will become apparent that it is generally useful enhancing the reproduction of images.

With present techniques employed in the reproduction of televised images and especially direct view color receivers, it has been found that they lack the desired contrast and realistic color composition. In addition the failure to produce sharply defined images causes material eye strain that is not only uncomfortable for the viewer but may also damage the eye. This invention overcomes these difficulties and may be made as an integral part of the image reproducing apparatus or used as an attachment thereto. In the case of image projecting devices, apparatus in accordance with the invention may be used in conjunction with the tube or projector or may be placed in any convenient location in the optical path.

Television image reproducing tubes produce an image by bombarding a phosphorescent screen by a high velocity electron beam in accordance with a predetermined pattern. While this procedure produces a large quantity of visible light, much of the energy is converted into invisible radiations including the infra-red, ultra violet, gamma and X-ray regions. Accordingly it is another object of the invention to provide means for utilizing these invisible radiations by transforming them into light and thereby increase the brightness and contrast of the image as well as to improve the color gradation.

Still another object of the invention resides in an improved energy transfer device for use with television reproducing systems to improve over-all picture rendition in both black and white and color and at the same time provide a more pleasing, natural, image that may be more comfortably observed by the viewer.

The above and other objects and advantages of the invention will become more apparent from the following description and drawings forming part of this application.

Figure 2A:
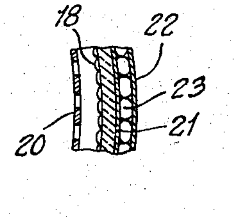
Fig. 2A is an enlarged fragmentary portion of Fig. 2.
Figure 1:
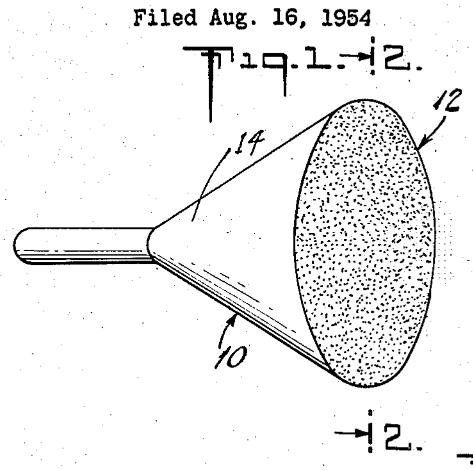
Fig. 1 is a perspective view of one embodiment of the invention.
Figure 1A:
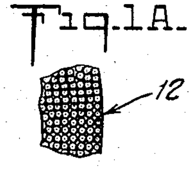
Fig. 1A is an enlarged fragmentary view of the screen of the tube shown in Fig. 1.

One of the more important applications of the invention resides in its use as an overlay or adaptor for cathode ray tubes of the type used in color television receivers though it will become evident that it is equally useful in monochrome equipment. This improved overlay is shown in Figs. 1 and 1A and Figs. 2 and 2A wherein the numeral 10 denotes a color reproducing tube and the numeral 12 denotes the overlay as applied to the face of the tube. More specifically cathode ray tubes including color reproducing tubes usually have a conical housing 14 terminating in a large round or rectangular front face 16 of glass or other transparent material. In the case of color tubes a phosphor mosaic 18 is formed of groups of dots of phosphor adapted to emit red and green and blue light and these dots are generally alternated so that like color dots do not adjoin one another. Immediately behind the mosaic 18 is a perforated plate 20 aligned with the mosaic and the three electron guns (not shown) so that one gun will activate only the red dots, another gun the green dots and the third gun the blue dots. Since the operation of a tube of this character and the associated electronic circuits are well known a more detailed description is not believed necessary.

Tubes of this type usually employ electron beam accelerating voltages of the order of 20 kv. and it has been found that resulting high electron velocities produce a substantial quantity of invisible radiation which of course represents wasted energy. This loss of energy can be overcome by the use of the overlay or adaptor 12 formed of a material that will produce visible light in response to visible as well as invisible radiations such as those mentioned above. This adaptor actually comprises a pair of overlying translucent or transparent plates 21 and 22 secured one to the other in any suitable manner. A phosphor mosaic 23 comprising a plurality of dots of red, green and blue phosphors is disposed therebetween with the different color dots being aligned with corresponding dots forming the tube mosaic 18. The overlay or adaptor 12 is preferably shaped to conform with the contour of the front face 16 of the tube 10. While I have illustrated the phosphor layer as being disposed between two plates, it is of course apparent that one of the plates is provided for protective purposes and is not essential to the operation of the invention.

With this arrangement, the visible light emanating from the mosaic 18 strikes the mosaic 23 to produce a corresponding colored image. The invisible energy also strikes the mosaic 23 and is converted into visible light rays adding to the brilliance of the image so that a brighter more distinct image appears on the mosaic 23 and may be viewed on the side opposite to that upon which such radiations impinge. In addition to the foregoing advantages, more realistic color renditions are obtained without unrealistic heightening or artificially appearing vividness. The invention as described above also increases the definition and sharpness of the image so that the picture can be viewed more comfortably and with considerably less eye strain.

The structure of this improved adaptor 12 for use with television systems may embody by way of example dots of phosphorescent or fluorescent pigments or dye stuffs responsive to the impingement of electromagnetic radiations such as X-rays, gamma rays and ultra violet and visible light ray so that the response is transmitted to produce light rays on the side opposite that upon which such impingement occurs. In this way all radiations emanating from the face of the normal cathode ray tube both visible and invisible are converted into visible light rays to increase the brightness, clarity and enhance the color rendition, definition and contrast. If desired one or both of the overlying walls 21 and 22 of the adaptor 12 may be provided with a mat finish on a base of either glass or plastic in order to reduce ambient reflections. By making the walls very thin little, if any, diffusion of the light will occur and a greatly improved picture results. While any suitable phosphorescent or fluorescent material may be used it is preferable to utilize a layer of transparent lacquer having a suitable phosphorescent material of short persistence in suspension therein. Such lacquers are well known in the art and commercially available.

Figure 2:
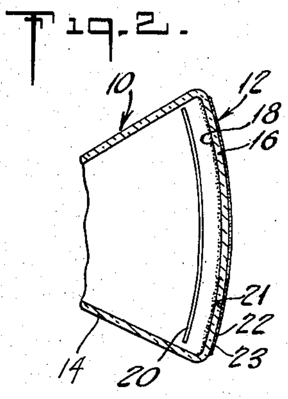
Fig. 2 is a cross sectional view of Fig. 1 taken along the line 2—2 thereof.
Figure 3A:
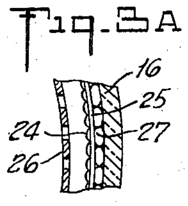
Fig. 3A is an enlarged fragmentary section of Fig. 3.
Figure 3:
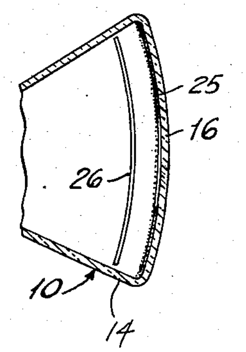
Fig. 3 is a cross sectional view of another embodiment of the invention.

Another form of the invention is illustrated in Figs. 3 and 3A wherein the color tube is denoted by the numeral 10 and the front face by the numeral 16. The color mosaic 24 is carried on the inner face of a thin transparent or translucent member 25 positioned adjacent the front face 16 of the tube and a mask 26 corresponding to the mask 20 of Fig. 2 is placed between the mosaic 24 and the electron guns. The outer face of the member 25 carries a mosaic 27 of red, green and blue phosphor dots which corresponds to the mosaic 23 of Figs. 1 and 2. With this arrangement the improved adaptor while embodied in the tube, produces the same important and effective results as the adaptor 12 of the previous figures. If desired this improved adaptor may also be embodied in the front face 16 of the tube or otherwise permanently secured thereto or embodied therein.

Figure 4:
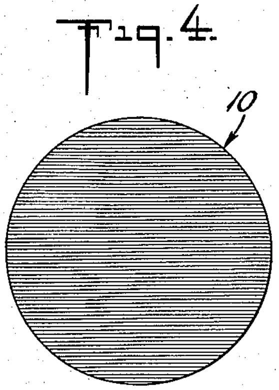
Fig. 4 is a front elevation of an adaptor for color tubes embodying tricolor stripes.
Figure 4A:
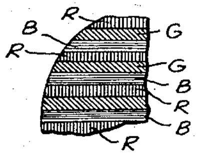
Fig. 4A is an enlarged fragmentary portion of Fig. 4.

Figs. 4 and 4A shows an adaptor along the lines of adaptor 12 but prepared for a color tube having tri color stripes. The adaptor may be made in the manner of adaptor 12 except that the red, green and blue phosphors are deposited in stripes across the surface thereof as illustrated. It is of course important that the different colored stripes be aligned with the corresponding colored stripes of the tube mosaic. While this form of the invention is shown as a separate structure for attachment to a tube, it may of course be embodied as part thereof.

Figure 5A:
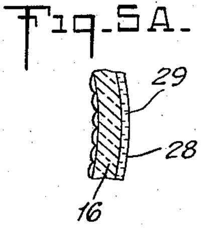
Fig. 5A is an enlarged fragmentary portion of Fig. 5.
Figure 5:
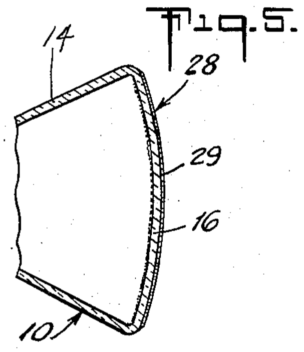
Fig. 5 is still another modification of the invention.

The previous forms of the invention have embodied phosphorescent materials of a solid nature. It may however be desirable to use thin liquid film of phosphor particles or phosphorescent dyestuffs. Such an arrangement is shown in Figs. 5 and 5A wherein the front face 16 of the television tube 10 is covered by a hollow overlay 28 filled with a suitable phosphorescent liquid 29 including one or more of the phosphors in suspension. With this arrangement the brilliance and definition of the image whether monochrome or color is greatly increased.

In the case of monochrome television tubes where the mosaics such as 18 in Fig. 2 comprise a uniform layer of a phosphor instead of a plurality of different colored dots, the adaptor 12 would of course merely comprise a uniform layer of transparent phosphor referred to above. This so-called monochrome adaptor is particularly useful for monochrome image producing tubes while the color adaptor would be useful for both monochrome and color tubes.

While the invention has been illustrated and described in connection with direct view monochrome and color television receivers, and as an adaptor for attachment to the tube, it is apparent that it can be placed at any convenient point in the optical path and may be used with other types of image reproducing systems wherein it is desired to enhance the picture definition, contrast and overall picture quality. Furthermore, other changes, modifications and alterations may be made without departing from the true scope and spirit of the invention.

What is claimed is:

1. An adaptor for application to the face of a receiving tube comprising a mosaic of at least two different and at least partially transparent phosphorescent materials in the form of small dots arranged in geometric formation with the different materials being uniformly distributed throughout the adaptor and means for supporting said mosaic.

2. An adaptor comprising a mosaic of at least two different phosphorescent materials arranged in line formation with the lines of different materials being alternated and means for supporting said mosaic.

3. The combination with a color television image reproducing tube, of an adaptor comprising at least one sheet of light transmitting material disposed in front of said tube, a substantially transparent phosphorescent mosaic on said sheet and responsive to visible and invisible radiations to produce light visible to an observer, said mosaic being formed of different phosphors having a color response corresponding to the colors produced by said tube and arranged to correspond with the different colored light producing means in said tube and responsive to interrupt transmission of ultra violet light and improve picture contrast and definition.

4. An adaptor for the reproduction of images comprsing a layer of at least partially transparent short persistence phosphorsecent material and light transmitting means for supporting said material, said phosphorescent material being adapted to produce visible light on at least one side thereof in response to the impingement of a beam of electromagnetic radiations on the other side thereof and carrying the image to be reproduced.

References Cited in the file of this patent

UNITED STATES PATENTS

| | | |
|---|---|---|
| 2,093,288 | Ogloblinsky | Sept. 14, 1937 |
| 2,366,319 | Donal | Jan. 2, 1945 |
| 2,418,780 | Leverenz | Apr. 8, 1947 |
| 2,423,830 | Fonda | July 15, 1947 |
| 2,425,330 | Kenyon | Aug. 12, 1947 |
| 2,452,522 | Leverenz | Oct. 26, 1948 |
| 2,595,548 | Schroeder | May 6, 1952 |
| 2,660,684 | Parker | Nov. 24, 1953 |
| 2,683,834 | Wright | July 13, 1954 |
| 2,756,363 | Wright | July 24, 1956 |